(12) United States Patent
Lee et al.

(10) Patent No.: US 7,065,286 B1
(45) Date of Patent: Jun. 20, 2006

(54) METHOD AND APPARATUS FOR TESTING OPTICAL FIBER BY USING BIORTHOGONAL CODES AND MOORE-PENROSE GENERALIZED INVERSES

(75) Inventors: Duckey Lee, 2-108, Banpo Apt., Banpobondong, Seocho, Seoul, 137-049 (KR); Namkyoo Park, Seoul (KR); Hosung Yoon, Seoul (KR)

(73) Assignee: Duckey Lee (KR)

( * ) Notice: Subject to any disclaimer, the term of this patent is extended or adjusted under 35 U.S.C. 154(b) by 0 days.

(21) Appl. No.: 11/127,784

(22) Filed: May 12, 2005

(30) Foreign Application Priority Data

May 11, 2005 (KR) ...................... 10-2005-0039261

(51) Int. Cl.
*H04B 3/36* (2006.01)
*H04K 1/10* (2006.01)
*G01N 33/48* (2006.01)

(52) U.S. Cl. .......................... 385/147; 356/39; 380/34; 375/200

(58) Field of Classification Search ................. 385/147
See application file for complete search history.

(56) References Cited

OTHER PUBLICATIONS

Receiver Structure of Generalized M-ary Optical DPSK System And Its Semi-analytical Performance Evaluation, Hosung Yoon, Duckey Lee and Namkyoo Park□□paper 14C3-4, OECC 2004, Yokohama, Jul., 2004.
SNR Improvement of a Non-Coherent OTDR Using Biorthogonal Codes and Moore-Penrose Generalized Inverses, Duckey Lee, Hosung Yoon, Na Young Kim, and Namkyoo Park□□paper We4, ECOC 2004, Stockholm, Sep., 2004.

*Primary Examiner*—Sung Pak
*Assistant Examiner*—Hoang Tran
(74) *Attorney, Agent, or Firm*—Harness, Dickey & Pierce, P.L.C.

(57) ABSTRACT

Disclosed is a method and an apparatus for testing an optical fiber by using a biorthogonal codes and a Moore-Penrose inverse matrix. The method includes the steps of: (a) coding 2n optical pulses according to each codeword of the n-bit biorthogonal code matrix (2n*n matrix), injecting the coded optical pulses into an optical fiber, and measuring 2n optical signals generated when the coded optical pulses are reflected from the optical fiber; (b) decoding the 2n optical signals measured in step (a) by means of the Moore-Penrose inverse matrix (n*2n matrix) for the n-bit biorthogonal code matrix, thereby restoring n signals; (c) shifting the n signals along the time axis to remove timing differences among the n signals; and (d) performing an average operation for the time-shifted n signals and obtaining a final measured value.

14 Claims, 8 Drawing Sheets

METHOD AND APPARATUS FOR TESTING OPTICAL FIBER BY USING BIORTHOGONAL CODES AND MOORE-PENROSE GENERALIZED INVERSES

FIELD OF THE INVENTION

The present invention relates to a method and an apparatus for testing an optical fiber by using a biorthogonal code set and a Moore-Penrose inverse matrix, and more particularly to a method for coding optical pulses by the biorthogonal code set, injecting the coded optical pulses into the optical fiber, measuring intensities of the reflected optical signals, and decoding optical signals reflected from the optical fiber by the Moore-Penrose inverse matrix, and an Optical Time Domain Reflectometer (Hereinafter, referred to as OTDR) using the method.

BACKGROUND OF THE INVENTION

An OTDR is an apparatus for injecting an optical pulse into an optical fiber, measuring intensities of reflected optical signals while the injected optical pulse passes through the optical fiber, and identifying characteristics of the optical fiber. That is, the OTDR is an apparatus for injecting an optical pulse into an optical fiber, analyzing a distance distribution of the intensity of radiation returned after being reflected from each point in a longitudinal direction, and measuring loss of the optical fiber, a distance to a connection point, connection loss, the amount of reflection from the connection point, a distance to a breakage point when the optical fiber has been broken, etc.

The reflection in the optical fiber is mainly caused by Rayleigh Backscattering or Fresnel reflections. The Rayleigh Backscattering occurs due to density in the optical fiber and refractive displacement caused by structural change. The Fresnel reflections occur due to connection or link between the optical fibers or difference of refractive index in an end of the optical fiber.

FIG. 1 is a block diagram showing the basic structure of an OTDR.

A Laser Diode (LD) 120 generates an optical pulse according to an electrical pulse generated by a pulse generator 110. The generated optical pulse is injected into an optical fiber 170 to be measured through an optical coupler 130.

Optical signals reflected from the optical fiber 170 are inputted to a Photo Diode (PD) 140 via the optical coupler 130. The Photo Diode 140 outputs electrical current proportional to intensities of the inputted optical signals.

The electrical current is converted into voltage and amplified by a Trans-Impedance Amplifier (TIA) 150, which is inputted to a microprocessor 100 via an Analog-to-Digital Converter (ADC) 160.

The microprocessor 100 processes a measured waveform of the voltage, displays the measured waveform as a function according to a distance from an injection point of the optical pulse on a display unit 180, and understands loss of the optical fiber, a distance to a place at which the loss of the optical fiber has occurred, etc., from the waveform. The measured waveform is called "OTDR trace".

For exact measurement in this OTDR, a method for improving a Signal-to-Noise Ratio (Hereinafter, referred to as SNR) may use a method for increasing a pulse width of an optical pulse. As the pulse width of the optical pulse increases, energy of inputted light increases. Therefore, intensities of reflected optical signals increases, so that the SNR is improved. However, it is impossible to detect abnormality of an optical fiber occurring an interval smaller than the pulse width. Consequently, a resolution may deteriorate.

Accordingly, a method (Hereinafter, referred to as average measurement method) for obtaining an average through several measurements has been used as a method capable of improving the SNR without deteriorating the resolution.

When the reflected original signal is referred to as s(t), an $i^{th}$ measured value is referred to as $r_i(t)$, and noise is referred to as $n_i(t)$ (i=1, 2, . . . , N), a relation between the three factors may be expressed by equation 1 below.

$$r_i(t)=s(t)+e_i(t) \ (i=1, 2, \ldots, N) \qquad \text{Equation 1}$$

In equation 1, when it is assumed that $e_i(t)$ is independent for i, an average is 0, and a dispersion is $\sigma^2$, an average of r(t) obtained by averaging N number of $r_i(t)$ may be expressed by equation 2 below and a dispersion (intensity of noise) of r(t) may be expressed by equation 3 below.

$$E\{r(t)\} = E\left\{\frac{1}{N}\sum_{i=1}^{N} r_i(t)\right\} \qquad \text{Eqution 2}$$
$$= E\left\{s(t) + \frac{1}{N}\sum_{i=1}^{N} e_i(t)\right\}$$
$$= s(t)$$

$$E\{[r(t)-s(t)]^2\} = E\left\{\left[\frac{1}{N}\sum_{i=1}^{N} e_i(t)\right]^2\right\} = \frac{\sigma^2}{N} \qquad \text{Equation 3}$$

As expressed by equation 3, it can be understood that the average measurement method of obtaining an OTDR trace through an average with N measurements has noise reduced by 1/N times at the cost of N times longer measurement time, as compared with a method of obtaining a trace through only one time measurement.

Recently, in order to improve the SNR, various methods have been proposed, which modulates optical pulses with a specific code, injects the modulated optical pulses into an optical fiber, and restores reflected signals by means of signal processing techniques, in addition to the average measurement method. From among the proposed methods, a method using a complementary code of Golay has been experimentally proved to improve the SNR as compared with the average measurement method as described above.

The method using the complementary code of Golay improves the SNR when a code length exceeds a predetermined length, but a resolution degrades twice due to a decoding characteristic of the Golay code, as compared with the average measurement method. Therefore, practical SNR performance is reduced by 3 dB than a proposed theoretical value.

SUMMARY OF THE INVENTION

Accordingly, the present invention has been made to solve the above-mentioned problems occurring in the prior art and to improve an SNR, and an object of the present invention is to provide a method for coding optical pulses by a biorthogonal code, injecting the coded optical pulses into an optical fiber, measuring intensities of the optical signals reflected from the optical fiber, and decoding the measured signals by using a Moore-Penrose inverse matrix, and an OTDR using the method.

In order to accomplish this object, there is provided a method for measuring a state of an optical fiber by means of biorthogonal codes and a Moore-Penrose inverse matrix, the method comprising the steps of: (a) coding 2n optical pulses according to each codeword of the n-bit biorthogonal code matrix (2n*n matrix), injecting the coded optical pulses into an optical fiber, and measuring 2n optical signals generated when the coded optical pulses are reflected from the optical fiber; (b) decoding the 2n optical signals measured in step (a) by means of the Moore-Penrose inverse matrix (n*2n matrix) for the n-bit biorthogonal code matrix, thereby restoring n signals; (c) shifting the n signals along the time axis to remove timing differences among the n signals; and (d) performing an average operation for the time-shifted n signals and obtaining a final measured value.

In order to accomplish this object, there is provided a method for measuring a state of an optical fiber by means of biorthogonal codes and a Moore-Penrose inverse matrix, the method comprising the steps of: (a) setting i to 1 and setting a final measured value to 0; (b) coding optical pulses according to an $i^{th}$ codeword of the n-bit biorthogonal code matrix (2n*n matrix), injecting the coded optical pulses into an optical fiber, measuring an $i^{th}$ optical signal generated when the coded optical pulses are reflected from the optical fiber, and storing the $i^{th}$ optical signal in a memory; (c) multiplying the $i^{th}$ optical signal to each of n elements of an $i^{th}$ column in the Moore-Penrose inverse matrix (n*2n matrix) for the n-bit biorthogonal code matrix, thereby restoring n signals which are partially decoded from the $i^{th}$ optical signal; (d) shifting the n signals along the time axis to remove timing differences among the n signals; (e) averaging the time-shifted n signals, obtaining an $i^{th}$ measured value; (f) updating the final measured value by adding the $i^{th}$ measured value to the final measured value, storing the updated final measured value in the memory, and deleting the $i^{th}$ optical signal and the $i^{th}$ measured value which are intermediately generated in the $i^{th}$ measurement; and (g) comparing whether i is equal to 2n or not, adding 1 to i and returning to step (b) if i is smaller than 2n, or employing a value finally stored in the memory as the final measured value if i is equal to 2n.

In order to accomplish this object, there is provided an apparatus for measuring a state of an optical fiber by means of a biorthogonal codes and a Moore-Penrose inverse matrix, the apparatus comprising: a processor for generating the n-bit biorthogonal code matrix, decoding optical signals reflected from the optical fiber by means of the Moore-Penrose inverse matrix for the n-bit biorthogonal code matrix, performing an average operation for the decoded signals; and obtaining a final measured value; a pulse generator for generating an electrical pulse according to a codeword received from the processor; an electrooptic converter for converting the electrical pulses generated by the pulse generator into an optical pulse; an optoelectric converter for receiving the optical signals reflected from the optical fiber, and generating electrical signals proportional to the optical signals, thereby converting the optical signals into the electrical signals; an optical coupler for injecting the optical pulses generated by the electrooptic converter into the optical fiber, and transferring the optical signals reflected from the optical fiber to the optoelectric converter; and an analog-to-digital converter for converting the voltage inputted from the trans-impedance amplifier into sampled digital values.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
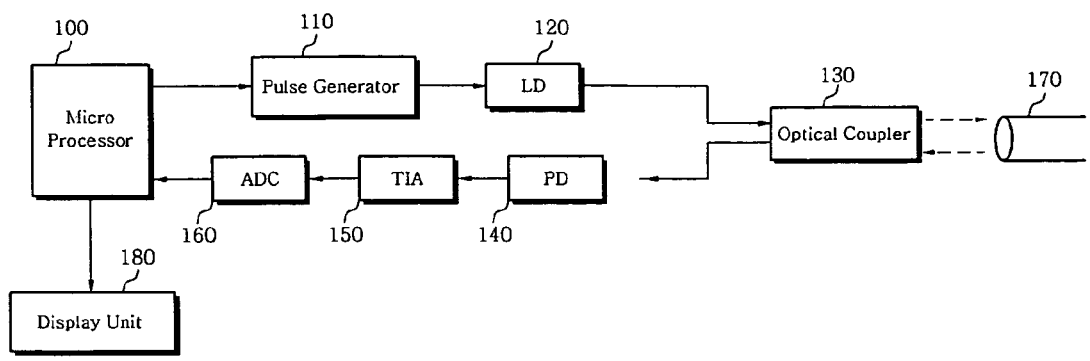
FIG. 1 is a block diagram showing the basic structure of an OTDR.

Hereinafter, preferred embodiments of the present invention will be described with reference to the accompanying drawings. In the following description and drawings, the same reference numerals are used to designate the same elements as those in other drawings. In the following description of the present invention, a detailed description of known configurations and functions incorporated herein will be omitted when it may make the subject matter of the present invention rather unclear.

Figure 2:
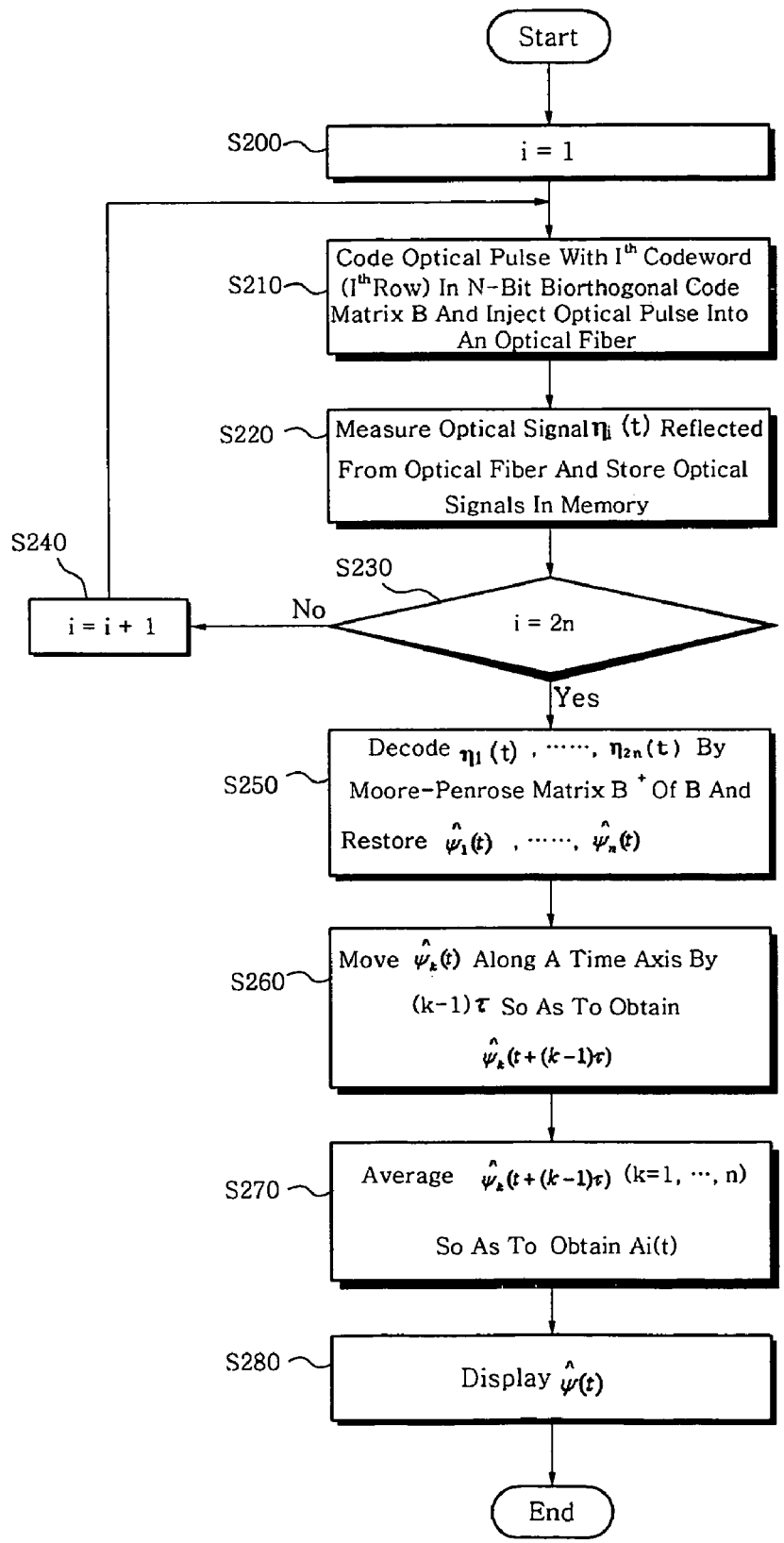
FIG. 2 is a flow diagram illustrating a method for measuring an optical fiber by using a biorthogonal code and a Moore-Penrose inverse matrix according to a first preferred embodiment of the present invention.

FIG. 2 is a flow diagram illustrating a method for measuring an optical fiber by using a biorthogonal code and a Moore-Penrose inverse matrix according to a first preferred embodiment of the present invention.

First, i is set to 1 (S200). Optical pulses are coded with an $i^{th}$ codeword ($i^{th}$ row of matrix B) in the n-bit biorthogonal code matrix B, and then is injected into an optical fiber (S210). Then, optical signals $\eta_i(t)$ reflected from the optical fiber are measured (S220). Herein, t represents the time when the optical signal $\eta_i(t)$ is measured, after the optical pulse is injected into the optical fiber.

This procedure is performed up to (i=2n) and the total 2n optical signals $\eta_1(t), \ldots, \eta_{2n}(t)$ are measured (S230 and S240).

The biorthogonal code matrix is obtained from a Hadamard matrix. When $n=2^m$, the n-bit biorthogonal code matrix $B_m$ (=B) becomes a 2n*n matrix expressed by equation 4 below. An $i^{th}$ row of the matrix is referred to as an $i^{th}$ codeword. Accordingly, the n-bit biorthogonal code matrix is constructed by 2n codewords each of which has a code length of n bit.

$$B_m = \begin{pmatrix} H_m \\ \overline{H}_m \end{pmatrix}, H_m = \begin{pmatrix} H_{m-1} & H_{m-1} \\ H_{m-1} & \overline{H}_{m-1} \end{pmatrix}, H_1 = \begin{pmatrix} 0 & 0 \\ 0 & 1 \end{pmatrix} \quad \text{Equation 4}$$

In equation 4, $H_m$ represents a Hadamard matrix and $\overline{H}_m$ represents a complementary matrix of $H_m$.

Further, $\eta_i(t)$ (i=1, 2, ..., 2n) represents an overlap of optical signals measured by each optical pulse (pulse width is $\tau$) coded according to each bit value (1 or 0, number of bits is n) of the $i^{th}$ codeword. Accordingly, $\eta_i(t)$ (i=1, 2, ..., 2n) may be expressed by equation 5 below.

$$\begin{pmatrix} \eta_1(t) \\ \vdots \\ \eta_{2n}(t) \end{pmatrix} = B \begin{pmatrix} \psi_1(t) \\ \vdots \\ \psi_n(t) \end{pmatrix} + \begin{pmatrix} e_1(t) \\ \vdots \\ e_{2n}(t) \end{pmatrix} \quad \text{Equation 5}$$

In equation 5, $\Psi_1(t)$ represents an ideal (noiseless) optical signal reflected when one optical pulse having a pulse width of $\tau$ is injected into an optical fiber. Further, $\Psi_1(t)$ has the same shape as a result signal capable of being obtained by a conventional OTDR performing only an average operation without a coding. Furthermore, $\Psi_i(t)$ represents an optical signal reflected when one optical pulse having a pulse width of $\tau$ is time-delayed by $(i-1)\tau$ and is injected into the optical fiber, which has a relation of $\Psi_i(t)=\Psi_1(t-(i-1)\tau)$ with the optical signal $\Psi_1(t)$. This is because a time point, at which an optical pulse corresponding to an $i^{th}$ bit of an n-bit codeword is injected into the optical fiber, has a delay of $(i-1)\tau$ as compared with a time point at which an optical pulse corresponding to a first bit of the n-bit codeword is injected into the optical fiber.

Also, $e_i(t)$ represents noise contained in an $i^{th}$ measured optical signal.

In the n-bit biorthogonal code matrix B of equation 4, since all the bits of a first codeword have values of only 0, it can be understood that $\eta_1(t)$ is always constructed by only the noise $e_1(t)$ when equation 5 is calculated. Accordingly, $\eta_1(t)$ has a value of 0 even without a practical measurement. Further, since all the bits of a $(n+1)^{th}$ codeword always consist of only 1 regardless of a code length, it can be understood that $\eta_{(n+1)}(t)$ is always constructed by a sum of $\Psi_1(t), \Psi_2(t), \ldots, \Psi_n(t)$ when equation 5 is calculated. Furthermore, since the n-bit biorthogonal code matrix B is constructed by $H_m$ and $\overline{H}_m$ which is a complementary matrix of $H_m$, $\eta_{(n+1)}(t)$ may be obtained by a sum of $\eta_{(n/2+1)}(t)$ and $\eta_{(3n/2+1)}(t)$. That is, since these values ($\eta_1(t)$ and $\eta_{(n+1)}(t)$) can be obtained without real measurement, the number of measurements can be reduced twice, from (2n−2) to 2n. Therefore, measurement time can be shortened.

For helping understanding of the present invention, a case where n is 2 will be described as an example with reference to FIG. 3.

Figure 3:
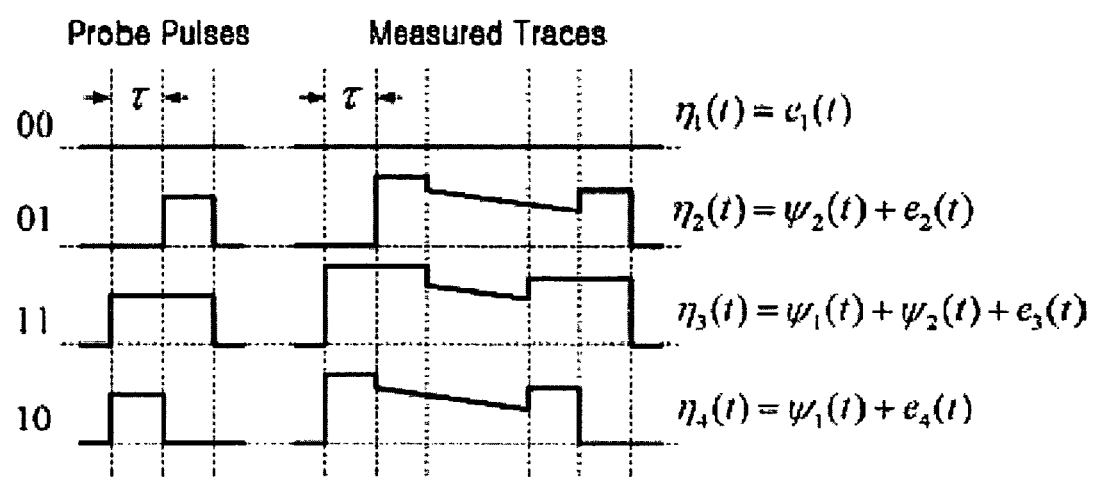
FIG. 3 is a diagram showing an optical signal measured according to four 2-bit biorthogonal codewords.

FIG. 3 is a diagram showing an optical signal measured according to four 2-bit biorthogonal codewords.

For example, an optical signal $\eta_2(t)$ measured according to a second codeword 01 represents an overlap of an optical signal reflected when an optical pulse coded with a first bit 0 is injected into an optical fiber, and an optical signal reflected when an optical pulse coded with a second bit 1 is injected into the optical fiber.

Accordingly, the following equation 6 is established.

$$\begin{pmatrix} \eta_1(t) \\ \eta_2(t) \\ \eta_3(t) \\ \eta_4(t) \end{pmatrix} = B \begin{pmatrix} \psi_1(t) \\ \psi_2(t) \end{pmatrix} + \begin{pmatrix} e_1(t) \\ e_2(t) \\ e_3(t) \\ e_4(t) \end{pmatrix}, B = \begin{pmatrix} 0 & 0 \\ 0 & 1 \\ 1 & 0 \\ 1 & 1 \end{pmatrix} \quad \text{Equation 6}$$

Equation 6 can be deployed to the equations as shown at the right side of FIG. 3.

From the deployed equations, it can be understood that $\eta_1(t)$ is constructed by only noise, $\eta_3(t)$ may be expressed by a sum of $\eta_2(t)$ and $\eta_4(t)$. This is because each bit of the first codeword has a value of only 0 and each bit of the third codeword has a value of only 1 in the matrix B of equation 6. Accordingly, $\eta_1(t)=0$ and $\eta_3(t)=\eta_2(t)+\eta_4(t)$ are employed without actually measuring both $\eta_1(t)$ and $\eta_3(t)$, so that the number of measurements can be reduced from four to two. This method (the newly employed method) shows difference only in the aspect of the noise but shows little difference in effect.

When $\eta_1(t), \ldots, \eta_{2n}(t)$ are obtained by 2n times or (2n−2) times of measurements as described above, $\hat{\psi}_i(t)$ (estimated value of $\Psi_i(t)$, i=1, 2, ..., n) is restored by performing a decoding with a Moore-Penrose matrix $B^+$ of the n-bit biorthogonal code matrix B (S250).

The Moore-Penrose inverse matrix $B^+$ is defined by (as) $(B^T B)^{-1} B^T$, where $B^T$ and $B^{-1}$ mean the transpose and the inverse of matrix B, respectively. When the Moore-Penrose inverse matrix $B^+$ is multiplied to both sides of equation 5, a decoding result is obtained as expressed by equation 7.

$$\begin{pmatrix} \hat{\psi}_1(t) \\ \vdots \\ \hat{\psi}_n(t) \end{pmatrix} = B^+ \begin{pmatrix} \eta_1(t) \\ \vdots \\ \eta_{2n}(t) \end{pmatrix} = \begin{pmatrix} \psi_1(t) \\ \vdots \\ \psi_n(t) \end{pmatrix} + B^+ \begin{pmatrix} e_1(t) \\ \vdots \\ e_{2n}(t) \end{pmatrix} \quad \text{Equation 7}$$

When $\eta_1(t)=0$ and $\eta_{(n+1)}(t)=\eta_{(n/2+1)}(t)+\eta_{(3n/2+1)}(t)$ are applied to equation 7, equation 8 is obtained due to difference in noise portion.

$$\begin{pmatrix} \hat{\psi}_1(t) \\ \vdots \\ \hat{\psi}_n(t) \end{pmatrix} = B^+ \begin{pmatrix} 0 \\ \vdots \\ \eta_{n/2+1} + \eta_{3n/2+1} \\ \vdots \\ \eta_{2n}(t) \end{pmatrix} = \begin{pmatrix} \psi_1(t) \\ \vdots \\ \psi_n(t) \end{pmatrix} + B^+_{eff} \begin{pmatrix} e_1(t) \\ \vdots \\ e_{2n}(t) \end{pmatrix} \quad \text{Equation 8}$$

In equation 8, the $\hat{\psi}_i(t)$ includes $\Psi_i(t)$ and noise changed by the matrix $B^+_{eff}$, but it reduces the noise power as compared with the existing average measurement method or the method using the Golay codes. As a result, the $\hat{\psi}_1(t)$ can improve the SNR. This will be described later.

For helping understanding of the present invention, a 2-bit biorthogonal code matrix will be described as an example.

When the Moore-Penrose inverse matrix $B^+$ is multiplied to both sides of equation 6, equation 9 is obtained. Further, when $\eta_1(t)=0$ and $\eta_3(t)=\eta_2(t)+\eta_4(t)$ are applied to equation 9, equation 10 is obtained.

$$\begin{pmatrix}\hat{\psi}_1(t)\\\hat{\psi}_2(t)\end{pmatrix} = B^+ \begin{pmatrix}\eta_1(t)\\\eta_2(t)\\\eta_3(t)\\\eta_4(t)\end{pmatrix} = \begin{pmatrix}\psi_1(t)\\\psi_2(t)\end{pmatrix} + B^+ \begin{pmatrix}e_1(t)\\e_2(t)\\e_3(t)\\e_4(t)\end{pmatrix} \quad \text{Equation 9}$$

$$B^+ = \frac{1}{3}\begin{pmatrix}0 & -1 & 1 & 2\\0 & 2 & 1 & -1\end{pmatrix}$$

$$\begin{pmatrix}\hat{\psi}_1(t)\\\hat{\psi}_2(t)\end{pmatrix} = B^+ \begin{pmatrix}0\\\eta_2(t)\\\eta_2(t)+\eta_4(t)\\\eta_4(t)\end{pmatrix} = \begin{pmatrix}\psi_1(t)\\\psi_2(t)\end{pmatrix} + B^+_{\text{eff}} \begin{pmatrix}e_1(t)\\e_2(t)\\e_3(t)\\e_4(t)\end{pmatrix} \quad \text{Equation 10}$$

$$B^+_{\text{eff}} = \frac{1}{3}\begin{pmatrix}0 & 0 & 0 & 3\\0 & 3 & 0 & 0\end{pmatrix}$$

Since $\hat{\psi}_i(t)$ restored from 2n measured optical signals is a signal having been delayed by $(i-1)\tau$ as compared with $\hat{\psi}_1(t)$, $\hat{\psi}_i(t)$ should be shifted along the time axis by $(i-1)\tau$ in order to synchronize the timing before the average operation. As a result, $\hat{\psi}_i(t+(i-1)\tau)$ is obtained (S260).

Then, an average of n signals shifted along the time axis is calculated, so that a final measured value $\hat{\psi}(t)$ is obtained (S270). Further, the final measured value $\hat{\psi}(t)$ is displayed (S280).

Herein, the final value $\hat{\psi}(t)$ may be displayed as a function of time t. Also, since the velocity of light is constant in an optical fiber, it is possible to display time as a function of a distance from an injection point of an optical pulse to a reflection point of the optical pulse by an equation, $t=2d/v$ (wherein d represents a distance from the point at which the optical pulse is injected into the optical fiber to the point from which the optical pulse is reflected in the optical fiber, and v represents the velocity of light in the optical fiber).

According to the first embodiment of the present invention, it is possible to improve the SNR as compared with the existing average measurement method or the method using the complementary code of Golay. This will be theoretically described herein below.

When the final measured value $\hat{\psi}(t)$ is expressed by means of equation 8, equation 11 is obtained.

$$\hat{\psi}(t) = \frac{1}{n}\sum_{i=1}^{n}\hat{\psi}_i(t+(i-1)\tau) = \psi_1(t) + \frac{1}{n}\sum_{i=1}^{n}\sum_{j=1}^{2n}b^+_{i,j}e_j(t+(i-1)\tau) \quad \text{Equation 11}$$

($b^+_{i,j}$ is an element of i row and j column in the matrix $B^+_{\text{eff}}$)

In equation 11, the latter part of the right side represents noise contained in the final measured value $\hat{\psi}(t)$.

When n has values of $2, 4, 8, \ldots, 2^m$, $b^+_{i,j}$ has a property as expressed by equation 12.

$$\sum_{j=1}^{2n}(b^+_{i,j})^2 = \frac{2n^3+2n^2+12}{n^2(n+1)^2}, \quad \text{Equation 12}$$

$$i=1,\ldots,n$$

When it is assumed that $e_i(t)$'s ($i=1, 2, \ldots, 2n$) are uncorrelated, zero-mean random processes with variance $\sigma^2$, $E\{\hat{\psi}(t)\}=\psi_1(t)$ and of the noise power (variance of $\hat{\psi}(t)$) contained in $\hat{\psi}(t)$ may be expressed by equation 13 by means of equations 11 and 12.

$$\text{Var}\{\hat{\psi}(t)\} = \text{Var}\left\{\frac{1}{n}\sum_{i=1}^{n}\sum_{j=1}^{2n}b^+_{i,j}e_j(t+(i-1)\tau)\right\} \quad \text{Equation 13}$$

$$= \frac{1}{n^2}\sum_{i=1}^{n}\sum_{j=1}^{2n}b^{+2}_{i,j}\sigma^2$$

$$= \frac{1}{n}\sum_{j=1}^{2n}b^{+2}_{i,j}\sigma^2$$

$$= \frac{2n^3+2n^2+12}{n^3(n+1)^2}\sigma^2$$

Since equation 13 is a result when the number of measurements is (2n-2), a coding gain equation as expressed by equation 14 can be obtained as compared with the average measurement method having the same number of times of measurement. The coding gain equation represents the degree of improvement of the SNR according to a coding when a measurement is performed using a coding scheme with the same time and resolution as those of the average measurement method.

$$\frac{\sqrt{\frac{\sigma^2}{2n-2}}}{\sqrt{\frac{2n^3+2n^2+12}{n^3(n+1)^2}\sigma^2}} = \sqrt{\frac{n^3(n+1)^2}{4(n-1)(n^3+n^2+6)}} \quad \text{Equation 14}$$

Figure 4:
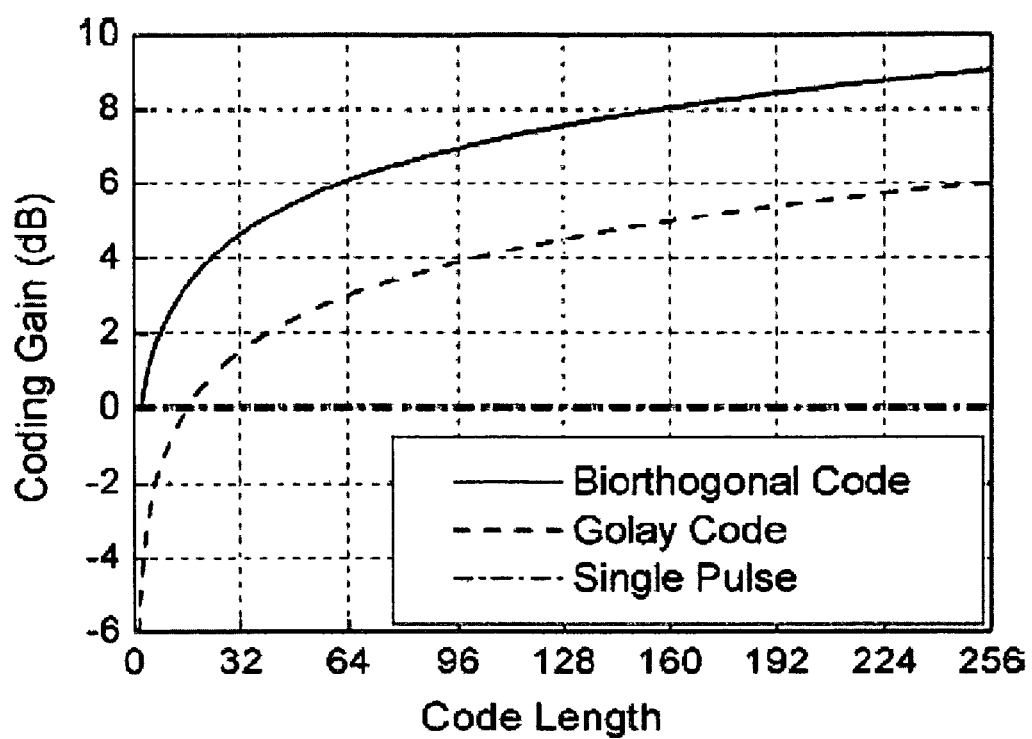
FIG. 4 is a graph showing a theoretical comparison of coding gains by an average measurement method, a method using a complementary code of Golay, and a method according to a first preferred embodiment of the present invention.

FIG. 4 is a graph showing a theoretical comparison of coding gains by the average measurement method, the method using the Golay codes, and the method according to the first preferred embodiment of the present invention.

It can be understood that the SNR measured according to the present invention is superior to that by the average measurement method, and is superior to that by the method using the Golay codes above 3 dB throughout an entire code length.

Figure 5:
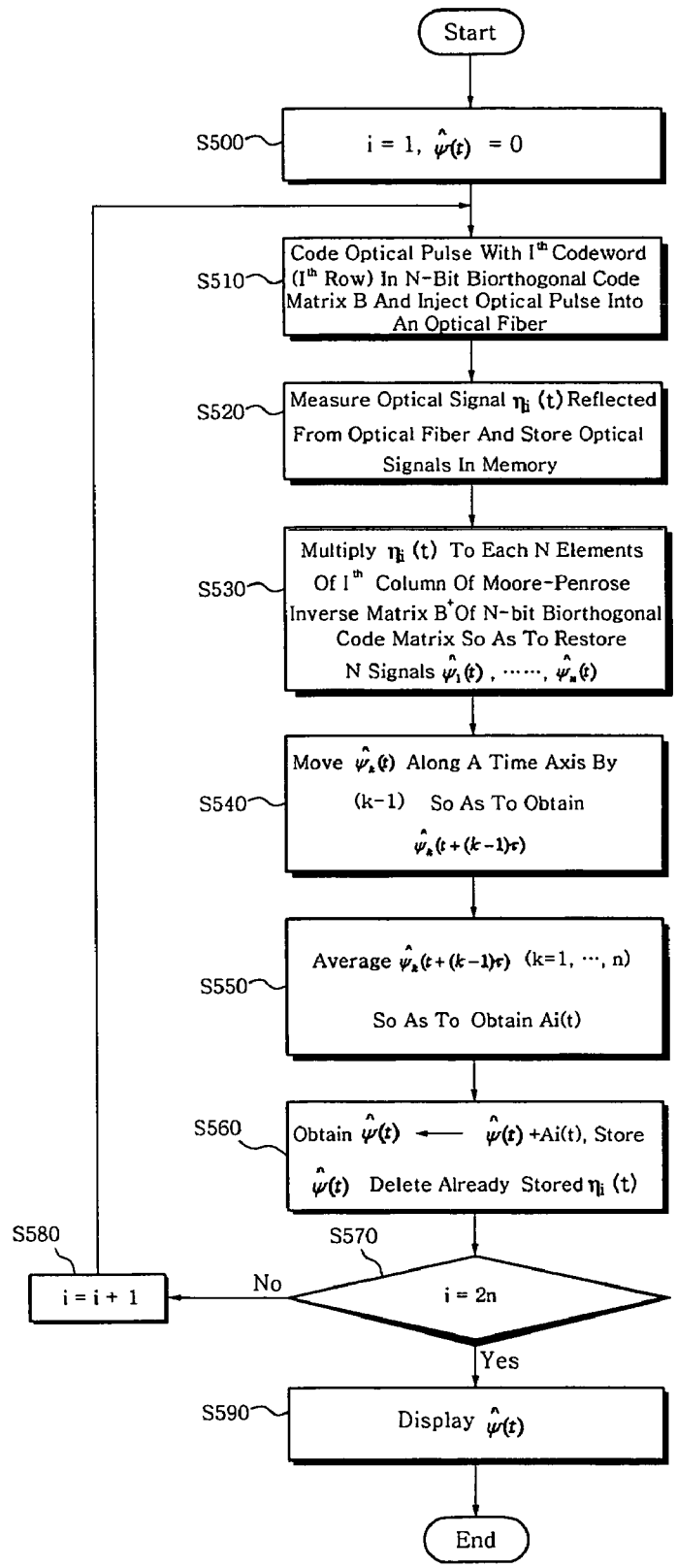
FIG. 5 is a flow diagram illustrating a method for measuring an optical fiber by using a biorthogonal code and a Moore-Penrose inverse matrix according to a second preferred embodiment of the present invention

FIG. 5 is a flow diagram illustrating a method for measuring an optical fiber by using a biorthogonal codes and a Moore-Penrose inverse matrix according to a second preferred embodiment of the present invention.

In the first embodiment, since a decoding is performed after all of $\eta_1(t), \ldots, \eta_{2n}(t)$ are measured and stored in a memory, the memory must have a large capacity in order to realize this procedure by an apparatus.

Accordingly, the second preferred embodiment of the present invention proposes the method for measuring the optical fiber by using the biorthogonal codes and the Moore- Penrose inverse matrix, in which a decoding is partially performed whenever $\eta_i(t)$ is measured, thereby reducing the memory capacity.

Equation 7 may be deployed as follows.

$$\hat{\psi}_1(t) = 0\eta_1 - \frac{1}{3}\eta_2 + \frac{1}{3}\eta_3 + \frac{2}{3}\eta_4$$

$$\hat{\psi}_2(t) = 0\eta_1 + \frac{2}{3}\eta_2 + \frac{1}{3}\eta_3 - \frac{1}{3}\eta_4$$

Then, an average of $\hat{\psi}_1(t)$ and $\hat{\psi}_2(t)$ after shifting to a time axis may be calculated as follows.

$$\frac{\hat{\psi}_1(t) + \hat{\psi}_2(t+\tau)}{2} = \left[\frac{0\eta_1(t) + 0\eta_1(t+\tau)}{2} + \ldots + \frac{\frac{2}{3}\eta_4(t) + \frac{-1}{3}\eta_4(t+\tau)}{2}\right]$$

The first term on the right side is an average of the multiplications between a first column of $B^+$ and $\eta_1(t)$, and the last term on the right side is an average of the multiplications between a fourth column of $B^+$ and $\eta_4(t)$.

When this principle is used, it is possible to partially perform a decoding whenever $\eta_i(t)$ is measured.

First, i is set to 1 and $\hat{\psi}(t)$ is set to 0 (S500). Then, an optical pulse is coded with an $i^{th}$ codeword of the n-bit biorthogonal code matrix B, and then is injected into an optical fiber (S510). Further, optical signals $\eta_i(t)$ reflected from the optical fiber are measured and stored in a memory (S520).

The measured optical signals $\eta_i(t)$ are multiplied to each of n elements of an $i^{th}$ column of the Moore-Penrose inverse matrix $B^+$ so as to partially decode n signals $\hat{\psi}_1(t)$, $\hat{\psi}_2(t), \ldots, \hat{\psi}_n(t)$ (S530).

The decoded signals $\hat{\psi}_k(t)$ is shifted along a time axis by $(k-1)\tau$ so as to obtain $\hat{\psi}_k(t+(k-1)\tau)(k=1,2, \ldots, n)$ (S540), and an average $A_i(t)$ of the n signals having shifted along the time axis is calculated (S550).

Further, $A_i(t)$ is continuously added to $\hat{\psi}(t)$ whenever i increases so as to update $\hat{\psi}(t)$, the updated $\hat{\psi}(t)$ is stored in the memory, and the already stored optical signal '$\eta_1(t)$ is deleted from the memory (S560). Then, it is determined whether i=2n or not (S570). When i is not 2n, 1 is added to i (S580) and the procedure proceeds to step 510. However, when i is 2n, $\hat{\psi}(t)$ is displayed (S590).

According to the method as described above, the memory deletes the already stored measurement result and has only to store the newly updated $\hat{\psi}(t)$, so that the required memory capacity can be greatly reduced.

For example, if an optical signal measured on the time domain is sampled with 10000 points (32-bit floating point for each point), the required memory capacity for a 256-bit biorthogonal code measurement is up to 165 mega-bits when a decoding process is performed at once after all the measurements are performed. On the other hand, the memory capacity of only 320 kilo-bits is required when the decoding process is partially performed during the measurements and the measured optical signals are immediately erased from the memory after they are used in the partial decoding process.

Hereinafter, an optical fiber measurement apparatus for performing the method as described above will be described.

Figure 6:
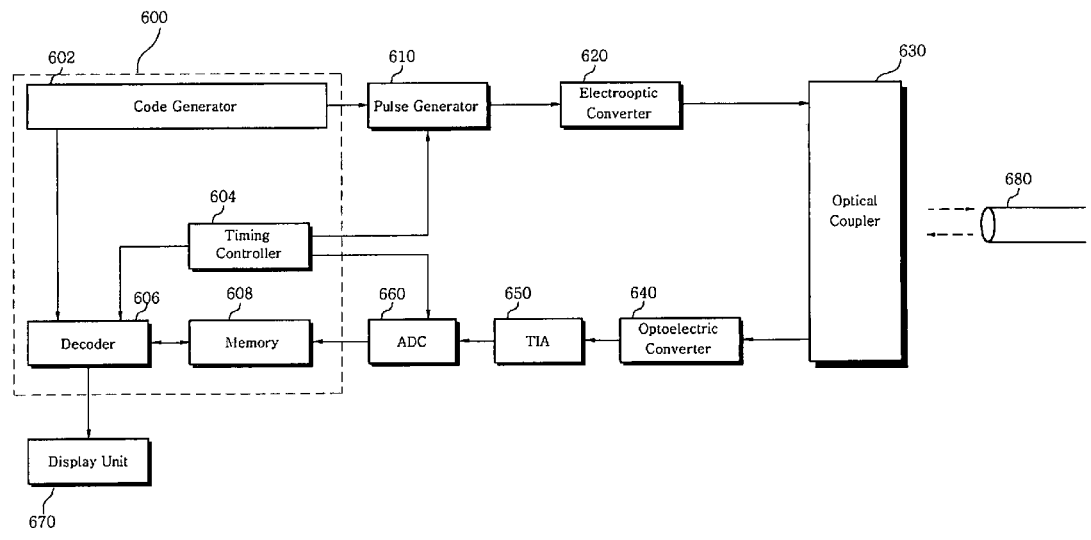
FIG. 6 is a block diagram illustrating an optical fiber measurement apparatus using a biorthogonal code and a Moore-Penrose inverse matrix according to a preferred embodiment of the present invention.

FIG. 6 is a block diagram illustrating the optical fiber measurement apparatus using a biorthogonal code and a Moore-Penrose inverse matrix according to a preferred embodiment of the present invention.

The apparatus as illustrated in FIG. 6 includes a processor 600, a pulse generator 610, an electrooptic converter 620, an optical coupler 630, an optoelectric converter 640, a Trans-Impedance Amplifier (hereinafter, referred to as TIA) 650, an Analog-to-Digital Converter (hereinafter, referred to as ADC) 660, and a display unit 670.

The processor 600 according to the preferred embodiment of the present invention generates the n-bit biorthogonal code matrix B, decodes optical signals reflected from an optical fiber 680 by means of the Moore-Penrose inverse matrix $B^+$, performs an average operation for the decoded optical signals, and calculates a final measured value.

More specifically, the processor 600 according to the preferred embodiment of the present invention includes a code generator 602, a timing controller 604, a decoder 606 and a memory 608.

When a biorthogonal code having a length n is inputted from a user, the code generator 602 generates the n-bit biorthogonal code matrix and transfers 2n codewords to the pulse generator 610.

The memory 608 stores the optical signals transferred from the ADC 660 and a result operated by the decoder 606.

The decoder 606 decodes 2n optical signals transferred from the ADC 660 by means of the Moore-Penrose inverse matrix, restores n signals, and shifts the n restored signals along a time axis under the control of the timing controller 604 so that the n restored signals have the same injection time point to the optical fiber 680. Then, the decoder 606 performs the average operation and calculates the final measured value.

It is preferred to realize the decoder 606 as the second preferred embodiment of the present invention in order to reduce the capacity of the memory 608. Accordingly, when an $i^{th}$ optical signal according to an $i^{th}$ codeword is transferred from the ADC 660, the decoder 606 multiplies the $i^{th}$ optical signal by each of n elements of an $i^{th}$ column in the Moore-Penrose inverse matrix, restores the n signals, partially performs the decoding, shifts the n partially decoded signals along the time axis under the control of the timing controller 604, performs the average operation, and calculates an $i^{th}$ measured value. Then, the decoder 606 repeats an operation of accumulating the $i^{th}$ measured value to the final measured value having been initially set to 0 and summing up the accumulated values from i=1 to i=2n. When i=2n, the final measured value according to the second embodiment is identical to the final measured value according to the first embodiment.

In this case, the memory 608 stores the $i^{th}$ optical signal. When the final measured value summed by the decoder 606 is calculated, the memory 608 updates and stores the final measured value, and deletes the already stored $i^{th}$ optical signal.

Further, the decoder 606 computes the final measured value as a function of time or computes the final measured value as a function of a distance by means of an equation t=2d/v (wherein d represents a distance from the point at which the optical pulse is injected to the point from which the optical pulse is reflected, and v represents the velocity of light in the optical fiber).

The timing controller 604 adjusts a pulse width for each one bit of the optical pulse coded according to the biorthogonal code.

Further, the n decoded optical signals may be measured at different times because corresponding optical pulses are injected into the optical fiber at different time points as described above. Accordingly, the timing controller 604 controls a timing so that the decoder 606 can shift the n decoded optical signals along the time axis and remove dime difference of $(i-1)\tau$ between the n optical signals.

It is preferred that the code generator 602 does not transfer a first codeword and a $(n+1)^{th}$ codeword to the pulse generator 610, and the decoder 606 employs an optical signal according to the first codeword as 0 and employs an optical signal according to the $(n+1)^{th}$ codeword as a sum of an optical signal according to the $(n/2+1)^{th}$ codeword and an optical signal according to the $(3n/2+1)^{th}$ codeword.

The pulse generator 610 according to the preferred embodiment of the present invention generates an electrical pulse according to the codeword received from the code generator 602, and the electrooptic converter 620 converts the electrical pulse generated by the pulse generator 610 into an optical pulse. The electrooptic converter 620 may include a Laser Diode (LD).

The optoelectric converter 640 according to the preferred embodiment of the present invention receives the optical signals reflected from the optical fiber 680, and generates electrical current proportional to power of the optical signals, thereby converting the optical signals into electrical signals. The optical coupler 630 injects the optical pulse generated by the electrooptic converter 620 into the optical fiber 680, and transfers the optical signals reflected from the optical fiber 680 to the optoelectric converter 640. The optoelectric converter 640 may include a photodiode (PD) or an Avalanche photodiode (APD).

The TIA 650 according to the preferred embodiment of the present invention converts the electrical current generated by the optoelectric converter 640 into voltage, amplifies the voltage, and transfers the amplified voltage to the ADC 660. The ADC 660 converts the voltage inputted from the TIA 650 into digital signals capable of being processed by the decoder 606.

The display unit 670 displays the final measured value operated by the decoder 606.

Hereinafter, a comparison of experimental results when the method of the present invention is used and the conventional average measurement method is used will be described with reference to FIGS. 7a and 7b.

In both methods, a pulse width is set to 500 ns in order to correspond to a resolution 50 m.

Figure 7A:
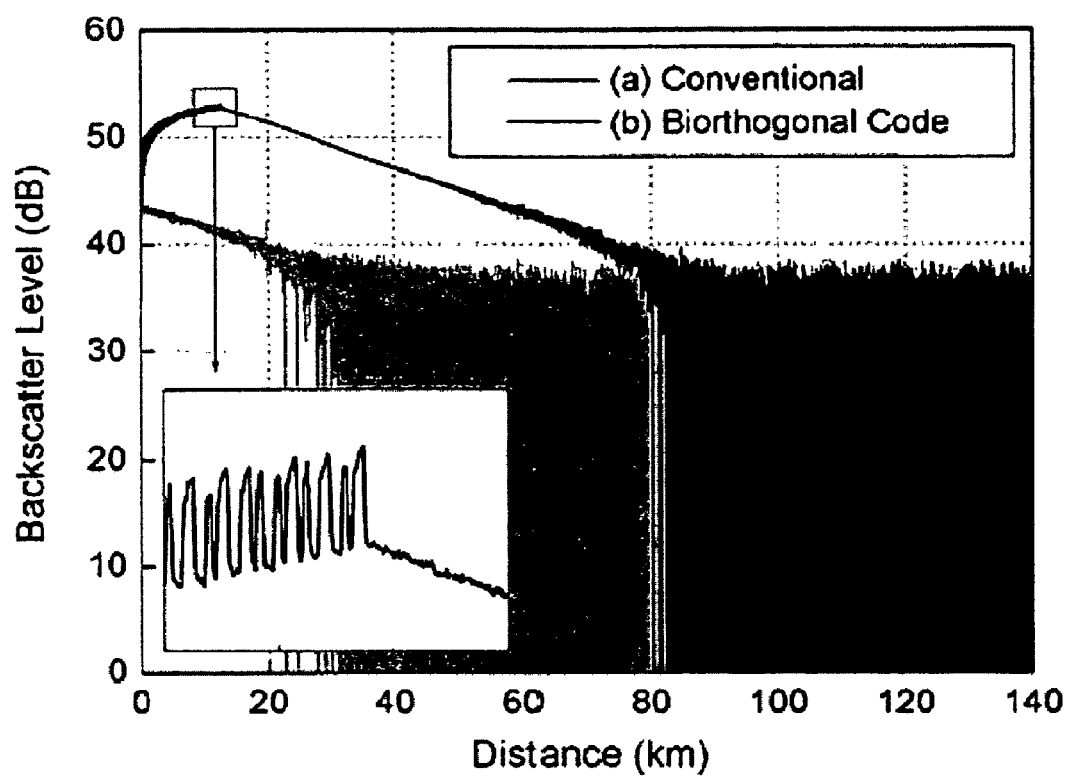
FIG. 7a is a graph illustrating one time measurement result (before a decoding) according to one 256-bit biorthogonal codeword, which is performed by the experimentally realized optical fiber measurement apparatus according to a preferred embodiment of the present invention.

FIG. 7a is a graph illustrating one time measurement result (before a decoding) according to one 256-bit biorthogonal codeword, which is performed by the experimentally realized optical fiber measurement apparatus according to a preferred embodiment of the present invention.

In FIG. 7a, the '(a) conventional' represents one time measurement result by a general apparatus using the average measurement method, and the '(b) biorthogonal code' represents the measurement result (before the decoding) by one of 510 number of 256-bit biorthogonal codes.

As illustrated in FIG. 7a, it can be understood that portions ranging from 20 km to 80 km, which have not been seen by noise in the average measurement method, are clearly measured and power of reflected optical signals becomes greater when the biorthogonal codeword is used.

Figure 7B:
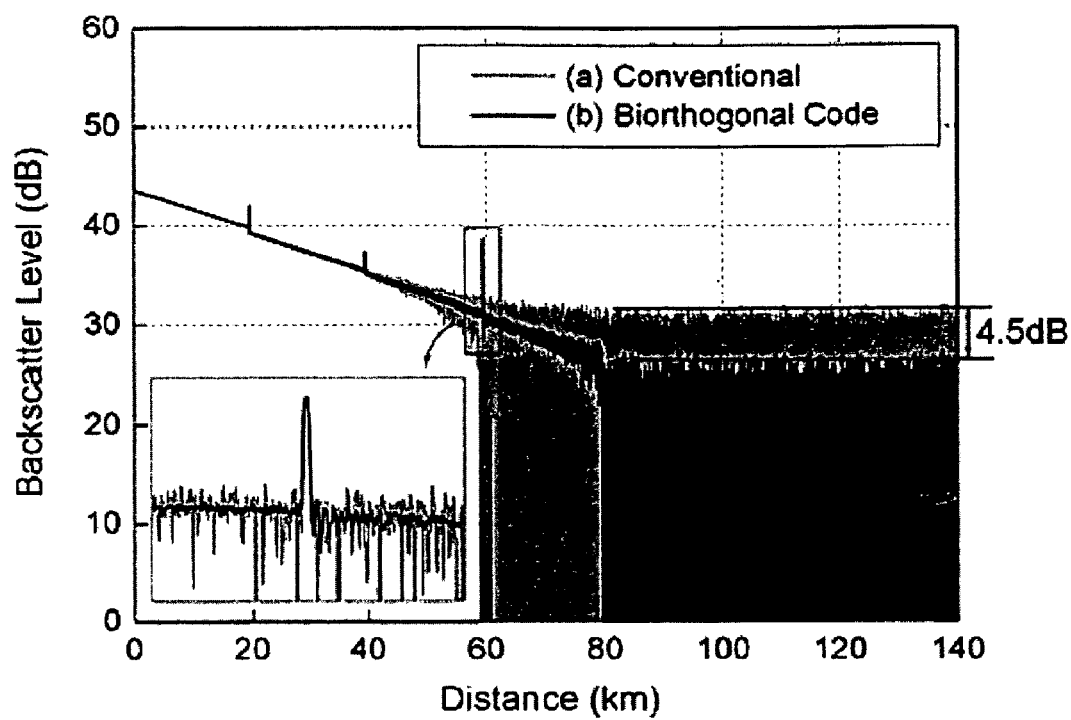
FIG. 7b is a graph illustrating a result (after a decoding) for a final measured value obtained by 510 times of measurements according to the total 510 number of 256-bit biorthogonal codewords, which is performed by the experimentally realized optical fiber measurement apparatus according to a preferred embodiment of the present invention.

FIG. 7b is a graph illustrating a result (after the decoding) for the final measured value obtained by 510 times of measurements according to the total 510 number of 256-bit biorthogonal codewords, which is performed by the experimentally realized optical fiber measurement apparatus according to the preferred embodiment of the present invention.

In FIG. 7b, the '(a) conventional' represents the result obtained by performing equalization after the total 510 times of measurements by the general apparatus using the average measurement method, and the '(b) biorthogonal code' represents the final measurement result after the total 510 times of measurements according to the 510 number of 256-bit biorthogonal codewords.

In the 256-bit biorthogonal code, the total number of codewords is 512. However, since measurements according to the first codeword and the $257^{th}$ codeword are omitted, the total number of measurements is 510. Accordingly, the 510 times of measurements have been performed even in the average measurement method.

As illustrated in FIG. 7b, when the number of measurements increases, the SNR is improved because influence by noise is reduced in the two methods. However, when the biorthogonal code is used, the SNR is greatly improved. Further, it can be understood that the SNR is improved by about 4.5 dB when the 256-bit biorthogonal code is used even under the same conditions, as compared with a case where the average measurement method is used.

The value theoretically obtained in equation 12 is 9.04 dB (code length is 256) as illustrated in FIG. 5. When this value is changed by a display scheme of the OTDR, 4.52 dB is obtained. Consequently, this value nearly coincides with the theoretically obtained value.

According to the present invention as described above, an SNR is improved even under the same conditions, as compared with the conventional average measurement method. Further, according to the present invention, the SNR is improved above 3 dB throughout an entire code length interval, as compared with the method using the Golay codes.

Although preferred embodiments of the present invention has been described for illustrative purposes, those skilled in the art will appreciate that various modifications, additions and substitutions are possible, without departing from the scope and spirit of the invention as disclosed in the accompanying claims.

The entire disclosure of Korean Patent Application No. 2005-39261 filed May 11, 2005 is incorporated by reference.

What is claimed is:

1. A method for measuring a state of an optical fiber by means of biorthogonal codes and a Moore-Penrose inverse matrix, the method comprising the steps of:

(a) coding 2n optical pulses according to each codeword of the n-bit biorthogonal code matrix (2n*n matrix), injecting the coded optical pulses into an optical fiber, and measuring 2n optical signals generated when the coded optical pulses are reflected from the optical fiber;

(b) decoding the 2n optical signals measured in step (a) by means of the Moore-Penrose inverse matrix (n*2n matrix) for the n-bit biorthogonal code matrix, thereby restoring n signals;

(c) shifting the n signals along the time axis to remove timing differences among the n signals; and (d) performing an average operation for the time-shifted n signals and obtaining a final measured value.

2. The method according to claim 1, wherein, in step (a), instead of measuring the first optical signal generated when the coded optical pulses according to a first codeword is reflected from the optical fiber, and a $(n+1)^{th}$ optical signal generated when the coded optical pulses according to a $(n+1)^{th}$ codeword is reflected from the optical fiber, the first optical signal is employed as 0 and the $(n+1)^{th}$ optical signal is employed as a sum of a $(n/2+1)^{th}$ optical signal and a $(3n/2+1)^{th}$ optical signal, thereby employing a number of measurements as $(2n-2)$.

3. The method according to claim 1, further comprising a step of:

(f) displaying the final measured value obtained in step (d) as a function of time, which is required for measuring the optical signal reflected in the optical fiber after the optical signal has been injected into the optical fiber, or displaying the final measured value as a function of a distance by an equation, $t=2d/v$ (wherein t represents the time, d represents a distance from a point at which the optical pulse is injected into the optical fiber to a point from which the optical pulse is reflected in the optical fiber, and v represents a velocity of light in the optical fiber).

4. A method for measuring a state of an optical fiber by means of biorthogonal codes and a Moore-Penrose inverse matrix, the method comprising the steps of:

(a) setting i to 1 and setting a final measured value to 0;

(b) coding optical pulses according to an $i^{th}$ codeword of the n-bit biorthogonal code matrix ($2n*n$ matrix), injecting the coded optical pulses into an optical fiber, measuring an $i^{th}$ optical signal generated when the coded optical pulses are reflected from the optical fiber, and storing the $i^{th}$ optical signal in a memory;

(c) multiplying the $i^{th}$ optical signal to each of n elements of an $i^{th}$ column in the Moore-Penrose inverse matrix ($n*2n$ matrix) for the n-bit biorthogonal code matrix, thereby restoring n signals which are partially decoded from the $i^{th}$ optical signal;

(d) shifting the n signals along the time axis to remove timing differences among the n signals;

(e) averaging the time-shifted n signals, obtaining an $i^{th}$ measured value;

(f) updating the final measured value by adding the $i^{th}$ measured value to the final measured value, storing the updated final measured value in the memory, and deleting the $i^{th}$ optical signal and the $i^{th}$ measured value which are intermediately generated in the $i^{th}$ measurement; and (g) comparing whether i is equal to 2n or not, adding 1 to i and returning to step (b) if i is smaller than 2n, or employing a value finally stored in the memory as the final measured value if i is equal to 2n.

5. The method according to claim 4, wherein, in step (a), instead of measuring the first optical signal generated when the coded optical pulses according to a first codeword is reflected from the optical fiber, and the $(n+1)^{th}$ optical signal generated when the coded optical pulses according to a $(n+1)^{th}$ codeword is reflected from the optical fiber, the first optical signal is employed as 0 and the $(n+1)^{th}$ optical signal is employed as a sum of a $(n/2+1)^{th}$ optical signal and a $(3n/2+1)^{th}$ optical signal, thereby employing a number of measurements as $(2n-2)$.

6. The method according to claim 4, further comprising a step of:

(h) displaying the final measured value in step (f) as a function of time, which is required for measuring the optical signal reflected in the optical fiber after the optical signal has been injected into the optical fiber, or displaying the final measured value as a function of a distance by an equation, $t=2d/v$ (wherein t represents the time, d represents a distance from a point at which the optical pulse is injected into the optical fiber to a point from which the optical pulse is reflected in the optical fiber, and v represents a velocity of light in the optical fiber).

7. An apparatus for measuring a state of an optical fiber by means of a biorthogonal codes and a Moore-Penrose inverse matrix, the apparatus comprising:

a processor for generating the n-bit biorthogonal code matrix, decoding optical signals reflected from the optical fiber by means of the Moore-Penrose inverse matrix for the n-bit biorthogonal code matrix, performing an average operation for the decoded signals; and obtaining a final measured value;

a pulse generator for generating an electrical pulse according to a codeword received from the processor;

an electrooptic converter for converting the electrical pulses generated by the pulse generator into an optical pulse;

an optoelectric converter for receiving the optical signals reflected from the optical fiber, and generating electrical signals proportional to the optical signals, thereby converting the optical signals into the electrical signals;

an optical coupler for injecting the optical pulses generated by the electrooptic converter into the optical fiber, and transferring the optical signals reflected from the optical fiber to the optoelectric converter; and an analog-to-digital converter for converting the voltage inputted from the trans-impedance amplifier into sampled digital values.

8. The apparatus according to claim 7, wherein the processor comprises:

a code generator for generating the n-bit biorthogonal code matrix after receiving a code length n from a user, and transferring 2n codewords to the pulse generator;

a timing controller for adjusting a pulse width of optical pulses and controlling time-shifts of the n decoded signals for synchronization among the signals;

a decoder for decoding the 2n optical signals received from the analog-to-digital converter by means of the Moore-Penrose inverse matrix so as to restore n signals, shifting the n signals along a time axis under a control of the timing controller, performing an average operation, and obtaining the final measured value; and a memory for the 2n optical signals received from the analog-to-digital converter and a result operated by the decoder.

9. The apparatus according to claim 8, wherein, when an $i^{th}$ optical signal according to an $i^{th}$ codeword is transferred from the analog-to-digital converter, the decoder multiplies the $i^{th}$ optical signal to each of n elements of an $i^{th}$ column in the Moore-Penrose inverse matrix so as to restore the n signals, partially performs a decoding for the n signals, shifts the n partially decoded signals along the time axis under the control of the timing controller, performs the average operation so as to obtain an $i^{th}$ measured value, and repeats an operation of accumulating the $i^{th}$ measured value to the final measured value having been initially set to 0 and summing up the accumulated values from i=1 to i=2n, and the memory stores the $i^{th}$ optical signal, updates and stores the final measured value with the $i^{th}$ measured value which are decoded from the $i^{th}$ optical signal, and deletes the $i^{th}$ optical signal and the $i^{th}$ measured value.

10. The apparatus according to claim 8, wherein the optical measurements according a first codeword and a $(n+1)^{th}$ codeword are not performed, and the decoder employs an optical signal according to the first codeword as 0 and employs an optical signal according to a $(n+1)^{th}$ codeword as a sum of an optical signal according to a $(n/2+1)^{th}$ codeword and an optical signal according to a $(3n/2+1)^{th}$ codeword.

11. The apparatus according to claim 7, wherein the electrooptic converter includes a Laser Diode (LD).

12. The apparatus according to claim 7, wherein the optoelectric converter includes an Avalanche photodiode (APD).

13. The apparatus according to claim 7, wherein the processor displays the final measured value as a function of time, which is required for measuring the optical signal reflected in the optical fiber after the optical signal has been injected into the optical fiber, or displaying the final measured value as a function of a distance by an equation, $t=2d/v$ (wherein t represents the time, d represents a distance from a point at which the optical pulse is injected into the optical fiber to a point from which the optical pulse is reflected in the optical fiber, and v represents a velocity of light in the optical fiber).

14. The apparatus according to claim 7, further comprising a display unit for displaying the final measured value obtained by the processor.

* * * * *